United States Patent Office 3,647,877
Patented Mar. 7, 1972

3,647,877
AMINOPROPIONANILIDES
Abraham Weber, Paris, Jacques Jean Frossard, Champigny, and Daniel Bouzard, Franconville, France, assignors to Mead Johnson & Company, Evansville, Ind.
No Drawing. Filed Apr. 13, 1970, Ser. No. 28,120
Int. Cl. C07c *103/44*
U.S. Cl. 260—562 N          5 Claims

ABSTRACT OF THE DISCLOSURE

This invention relates to aminopropionanilides which are prepared by acylation of 4'-amino-5'-chloro-2'-methoxy-(2-diethylamino)propionanilide with (lower)alkanoyl halides or (lower)alkanoic acid anhydrides. The diethylamino propionanilide products are pharmacologically active in mammals and when administered thereto in effective doses produced depression of the central nervous system with resulting hypnosis. Diethylaminopropionanilides which are particularly useful as hypnotic agents are 2'-methoxy-4'-acetamido - 5' - chloro - (2-diethylamino)propionanilide and 2'-methoxy - 4' - propionamido-5'-chloro-(2-diethylamino)propionanilide.

SUMMARY OF THE INVENTION

This invention relates to aminopropionanilides represented by Formula I and acid addition salts thereof.

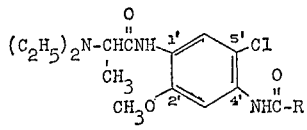

Formula I

In the above formula, R stands for hydrogen and lower alkyl of from 1 to 3 carbon atoms inclusive. Lower alkyl is comprised of straight or branched carbon chains having from 1 to 3 carbon atoms inclusive such as, methyl, ethyl, propyl, and isopropyl. As an aid to nomenclature, the positions of the aromatic ring in Formula I are numbered.

The process for the preparation of the aminopropionanilides of Formula I is schematically represented by the following formulas:

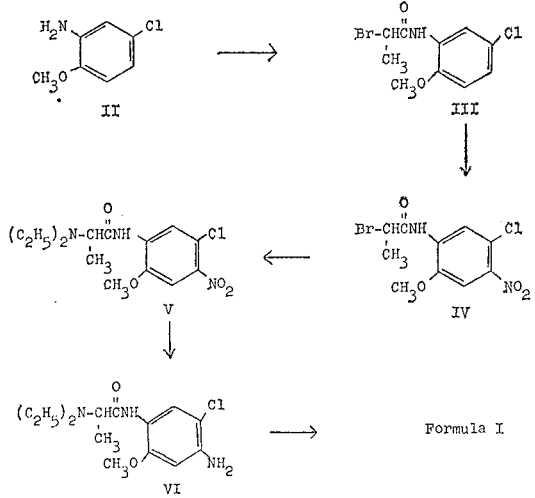

Condensation of 5-chloro-2-methoxyaniline (II) with 2-bromopropionyl chloride provides 5'-chloro-2'-methoxy-2-bromopropionanilide (III). Hydrogen chloride is evolved during the condensation which is preferably carried out in benzene solution employing an excess of 2-bromopropionyl chloride with respect to 5-chloro-2-methoxyaniline. Nitration of (III) yields 5'-chloro-2'-methoxy-4'-nitro-2-bromopropionanilide (IV). Preferably, the nitration is carried out by adding fuming nitric acid to a glacial acetic acid solution of 5' - chloro - 2' - methoxy-2-bromopropionanilide (III). The bromopropionanilide (IV) treated with an excess of diethylamine in ethanol as a solvent furnishes 5'-chloro-2'-methoxy - 4' - nitro-(2-diethylamino)propionanilide (V) which is catalytically reduced in an alcoholic solvent to 4'-amino - 5' - chloro - 2' - methoxy-(2-diethylamino)propionanilide (VI). Alcoholic solvents such as methanol, ethanol and isopropanol are particularly useful. The reduction is preferably carried out employing platinum oxide or Raney nickel as the catalyst. Alternatively the reduction may be carried out with iron powder and hydrochloric acid in ethanolic solution.

Formula I compounds of the present invention wherein R is lower alkyl are prepared by acylation of 4'-amino-5'-chloro-2'-methoxy - (2-diethylamino)propionanilide (VI) with alkanoyl halides or alkanoic acid anhydrides in an inert reaction solvent such as acetone, acetonitrile, dioxane, benzene, chloroform and the like. For example, reaction of 4'-amino - 5' - chloro-2'-methoxy-(2-diethylamino)propionanilide (VI) with an alkanoyl halide such as propionyl chloride in acetone provides 5'-chloro-2'-methoxy-4'-propionamido - (2-diethylamino)propionanilide while reaction of an alkanoic acid anhydride such as acetic anhydride with VI yields 5'-chloro-2'-methoxy-4'-acetamido-(2-diethylamino)propionanilide.

The compound of Formula I wherein R is hydrogen, 5'-chloro - 2' - methoxy - 4' - formamido-(2-diethylamino)propionanilide, is obtained by formylation of 4'-amino-5'-chloro - 2' - methoxy-(2-diethylamino) propionanilide with formic acid.

The compounds of Formula I are basic compounds and as free bases are practically insoluble in water although they are readily soluble in organic solvents. Acid addition salts of Formula I are generally water soluble.

Compounds of the present invention represented by Formula I are converted to the non-toxic pharmaceutically acceptable acid addition salts by treating an acetone solution of the free base with gaseous or ethanolic hydrogen chloride. Other non-toxic pharmaceutically acceptable acid addition salts can also be prepared by treating the free base of the compounds of Formula I with other suitable organic or inorganic acids. Exemplary of acids for this purpose include hydrobromic, sulfuric, phosphoric, nitric, benzoic, methylsulfonic, p-tolylsulfonic, benzenesulfonic, naphthylene sulfonic, salicylic, glycolic, acetic, maleic, succinic, tartaric, stearic, palmitic, citric, glutaric, lactic, and so on.

The compounds of the present invention defined by Formula I and their salts possess useful pharmacological activity in mammals. These compounds, in particular, possess central nervous system depressant (including tranquilizing, sedative and hypnotic) and anti-spasmodic activity. More particularly, systemic administration of the compounds of the present invention to mammals produces a hypnotic effect therein. For example, intravenous administration of 2'-methoxy-4'-acetamido-5'-chloro(2-diethylamino)propionanilide to a mouse at a dose of 100 milligrams per kilogram of body weight produces an hypnotic effect lasting about 17 minutes. This same compound administered intraperitoneally to the mouse at a dose of 250 mg./kg. of body weight produces an hypnotic effect lasting about 41 minutes whereas a dose of 500 mg./kg. administered orally results in an hypnotic effect lasting about 39 minutes.

In general, systemic administration of the compounds of Formula I to mammals between dosages ranging from about 2.0 to about 750 mg./kg. of body weight of the mammal produces significant depression of the central nervous system to induce an hypnotic effect. For larger mammals of about 70 kg. average body weight, a single or multiple dose that is equivalent to a range from about 125 mg. to about 1000 mg. per day per mammal is preferred.

The compounds of the present invention are relatively non-toxic at the dosage necessary to produce a useful pharmacological activity. Intraperitoneal $LD_{50}$ values in the mouse for the compounds of the present invention are in excess of 400 mg./kg. body weight. Representative of the toxicity of the compounds of the present invention is 2'-methoxy-4'-acetamido-5'-chloro-(2 - diethylamino)propionanilide which has, in the mouse, an intraperitoneal $LD_{50}$ value of 687 mg./kg. In the rat this compound has $LD_{50}$ values of 580 mg./kg. when administered intraperitoneally and 1320 mg./kg. when administered orally. The compounds of the present invention are well tolerated when chronically administered.

The compounds of Formula I can be administered to mammals in the form of free bases or in the form of one of their non-toxic pharmaceutically acceptable addition salts of Formula I compounds. In either form the compounds of Formula I can be compounded and formulated into pharmaceutical compositions of unit dosage forms suitable for systemic administration with organic or inorganic solid materials or liquids such as corn starch, lactose, water, sesame seed oil, peanut oil, propylene glycol and so on. Pharmaceutical compositions considered within the scope of this invention may take the form of tablets, powder, granules, capsules, suspensions, solutions, suppositories, elixirs, ointments and the like. Preferably, pharmaceutical unit dosage forms comprise a significant quantity of a pharmaceutical carrier hereinabove described and from about 2–750 milligrams of the compounds of Formula I.

The following examples are intended to illustrate and are not to be construed as limiting the scope of the present invention.

DESCRIPTION OF THE SPECIFIC EMBODIMENTS

EXAMPLE 1

5'-chloro-2'-methoxy-4'-acetamido-(2-diethylamino) propionanilide (A) 5'-chloro-2'-methoxy-4'-nitro - 2 - bromopropionanilide: 5'-chloro-2'-methoxyaniline reacted with 2-bromopropionyl chloride in benzene provides 5'-chloro-2'-methoxy-2-bromopropionanilide, M.P. 133° C. This material is nitrated in the following manner. A stirred suspension of 290 g. of 5'-chloro-2'-methoxy-2-bromopropionanilide in 1.8 liters of glacial acetic acid is treated over a period of 1 hours with 220 ml. of fuming nitric acid (d.=1.52) at a temperature of 35° C. The mixture is stirred for one hour at room temperature and then poured into 6 liters of cold water. The propionanilide crystallizes and is collected and dried, yield 323 g., M.P. 121° C.

(B) 5'-chloro-2'-methoxy - 4' - nitro-(2-diethylamino)-propionanilide: A stirred solution of 914 g. (2.7 mole) of 2'-methoxy-4'-nitro-2'-bromopropionanilide in 3 liters of ethanol is treated slowly with 1 liter of diethylamine (706 g., 9.7 mole) while maintaining a temperature of 35° C. The mixture is refluxed for 4 hours, cooled and permitted to stand overnight. A yellowish solid precipitates which is collected and dried, yield 750 g., M.P. 143° C.

(C) 4' - amino-5'-chloro-2'-methoxy-(2-diethylamino)-propionanilide: The 5'-chloro-2'-methoxy-4'-nitro-(2-diethylamino)propionanilide intermediate (30 g., 0.1 mole) is catalytically hydrogenated in 500 ml. of methanol at room temperature employing 0.5 g. of platinum oxide ($PtO_2 \cdot H_2O$) catalyst. After the calculated amount of hydrogen (0.3 mole) has been absorbed, the mixture is filtered and the filtrate concentrated. The residue crystallized from ethanol provides analytically pure 4'-amino-5'-chloro - 2' - methoxy-(2-diethylamino)propionanilide, a white solid with a melting point of 156° C.

*Analysis.*—Calcd. for $C_{14}H_{22}ClN_3O_2$ (percent): C, 56.08; H, 7.39; N, 14.01. Found (percent): C, 56.09; H, 7.36; N, 14.22.

(D) Acetic anhydride (10.2 g., 0.1 mole) is slowly added to 4'-amino-5'-chloro-2'-methoxy-(2-diethylamino) propionanilide (30 g., 0.1 mole) in 300 ml. of benzene. The mixture stirred and refluxed for 2 hrs. and the benzene solvent then removed by evaporation provides a residue which is taken up dilute hydrochloric acid. The acidic solution is basified with concentrated ammonium hydroxide and then extracted with ether. After drying, the ethereal solution is concentrated and the residual base crystallized from cyclohexane to provide analytically pure 5' - chloro-2'-methoxy - 4' - acetamido-(2-diethylamino) propionanilide.

*Analysis.*—Calcd. for $C_{16}H_{24}ClN_3O_3$ (percent): C, 56.21; H, 7.07; N, 12.29. Found (percent): C, 56.49; H, 7.76; N, 12.39.

EXAMPLE 2

5'-chloro-2'-methoxy-4'-propionamido-(2-diethylamino) propionanilide

Propionyl chloride (18 ml., 19.2 g., 0.28 mole) in 150 ml. of acetone is added rapidly to 4'-amino-5'-chloro-2'-methoxy-(2-diethylamino)propionanilide (51 g., 0.17 mole) in 400 ml. of acetone with stirring. After the addition is completed, the mixture is refluxed for 2 hrs., and the solvent is evaporated providing a residue which is taken up in dilute hydrochloric acid. The hydrochloric acid solution is made basic with ammonia and then extracted with ether. The ethereal extract is washed with water, dried and concentrated to a small volume. On refrigeration there is obtained 47 g. of product, M.P. 95° C.

*Analysis.*—Calcd. for $C_{17}H_{26}ClN_3O_3$ (percent): C, 57.37; H, 7.36; N, 11.80. Found (percent): C, 56.40; H, 7.25; N, 11.70.

The hydrochloric salt of 5'-chloro-2'-methoxypropionamido-(2-diethylamino)propionanilide is prepared by dissolving the base in acetone and acidifying with hydrogen chloride. The hydrochloride melts at 200° C. with decomposition.

EXAMPLE 3

5'-chloro-2'-methoxy-4'-(2-methylpropionamido)-(2-diethylamino)propionanilide

The procedure of Example 2 is repeated substituting isobutyryl chloride (2-methylpropionyl chloride) for propionyl chloride. The product is purified by crystallization from cyclohexane and has a melting point of 99° C.

*Analysis.*—Calcd. for $C_{18}H_{28}ClN_3O_3$ (percent): C, 58.45; H, 7.63; N, 11.36. Found (percent): C, 58.62; H, 7.75; N, 11.60.

EXAMPLE 4

5'-chloro-2'-methoxy-4'-butyrylamido-(2-diethylamino) propionanilide

The procedure of Example 2 is repeated employing n-butyryl chloride in lieu of propionyl chloride. The product can be crystallized from isopropyl ether and has a melting point of 74° C.

*Analysis.*—Calcd. for $C_{18}H_{28}ClN_3O_3$ (percent): C, 58.45; H, 7.63; N, 11.36. Found (percent): C, 58.21; H, 7.70; N, 11.64.

EXAMPLE 5

5'-chloro-2'-methoxy-4'-formamido-(2-diethylamino) propionanilide

A mixture of 4'-amino-5'-chloro-2'-methoxy-(2-diethylamino)propionanilide (3.0 g., 0.01 mole) and 3 ml. of formic acid (98–100%) is refluxed for 4 hrs., cooled and dissolved in water. The solution is made basic by the addition of 2 N sodium hydroxide solution providing a precipitate which is taken up in ether. After washing the ethereal solution with water, drying over magnesium sulfate and evaporating there is obtained 2.8 g. of a residue melting at 100–102° C. Crystallization of the residue from 2-propanol affords 5' - chloro-2'-methoxy-4'-formamido-2-(diethylamino)propionanilide having a melting point of 104° C.

Analysis.—Calcd. for $C_{15}H_{22}ClN_3O_3$ (percent): N, 12.82; Cl, 10.81. Found (percent): N, 12.71; Cl, 10.12.

EXAMPLE 6

Tablets

The propionanilides of Formula I are compounded into tablets according to the following example.

| Material: | Amount, g. |
|---|---|
| 5' - chloro-2'-methoxy-4'-acetamido-(2-diethylamino)propionanilide | 125.0 |
| Magnesium stearate | 1.3 |
| Corn starch | 12.4 |
| Corn starch pregelatinized | 1.3 |
| Lactose | 110.0 |

The foregoing materials are blended in a twin-shell blender and then granulated and then pressed into tablets weighing 250 mg. each. Each tablet contains 125 milligrams of active ingredient.

EXAMPLE 7

Solution for parenteral injection

The propionanilides of Formula I are formulated for parenteral administration according to the following example. A sterile solution is prepared by dissolving 22 g. of 5'-chloro-2'-methoxy-4'-acetamido-(2 - diethylamino) propionanilide hydrochloride in 2 liters of water for injection, USP. The solution is adjusted to pH 4.2 with 0.1 N-sodium hydroxide and then sterilized by passage through a bacteriological filter. Ten milliliter glass ampules are aseptically filled with a sufficient amount (about 5 ml.) of the solution to provide a dose of 50 mg. of active ingredient per ampule.

While several specific embodiments are described in the foregoing, it will be appreciated that other modifications may be made without departing from the spirit and scope of the appended claims.

What is claimed is:

1. A compound selected from the group consisting of aminopropionanilides having the formula:

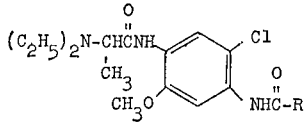

wherein R is hydrogen or lower alkyl from 1 to 3 carbon atoms inclusive, and the non-toxic pharmaceutically acceptable salts thereof.

2. A compound of the group defined in claim 1 which is 5' - chloro-2'-methoxy-4'-acetamido - (2-diethylamino) propionanilide.

3. A compound of the group defined in claim 1 which is 5' - chloro-2'-methoxy-4'-acetamido-(2-diethylamino)-propionanilide hydrochloride.

4. A compound of the group defined in claim 1 which is 5' - chloro-2'-methoxy - 4' - propionamido-(2-diethylamino)propionanilide.

5. A compound of the group defined in claim 1 which is 5' - chloro-2'-methoxy - 4' - propionamido-(2-diethylamino)propionanilide hydrochloride.

References Cited

UNITED STATES PATENTS 3,424,767   1/1969   Burdeska et al. _____ 260—562

HENRY R. JILES, Primary Examiner

H. I. MOATZ, Assistant Examiner

U.S. Cl. X.R.

260—562 B; 429—324